No. 788,112. PATENTED APR. 25, 1905.
H. R. MASON.
FLUID PRESSURE BRAKE.
APPLICATION FILED JUNE 26, 1903.
2 SHEETS—SHEET 2.
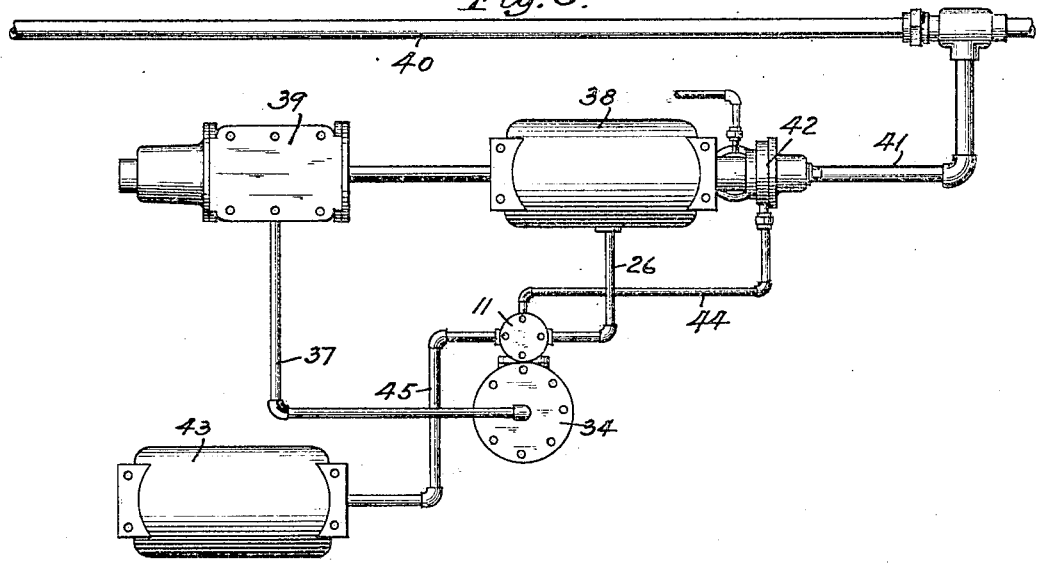
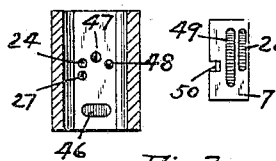
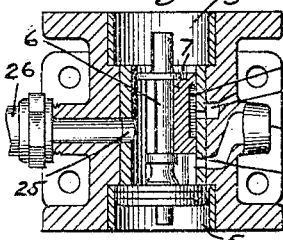
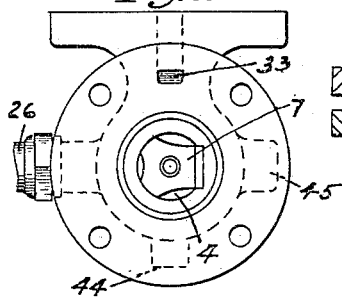
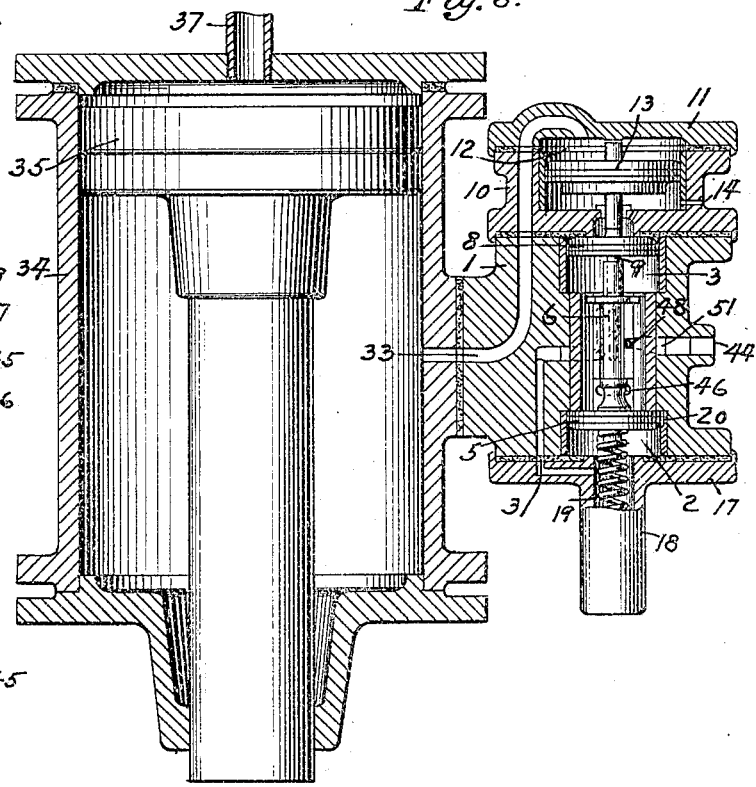
WITNESSES
INVENTOR
Harry R. Mason
By E. Wright Att'y.

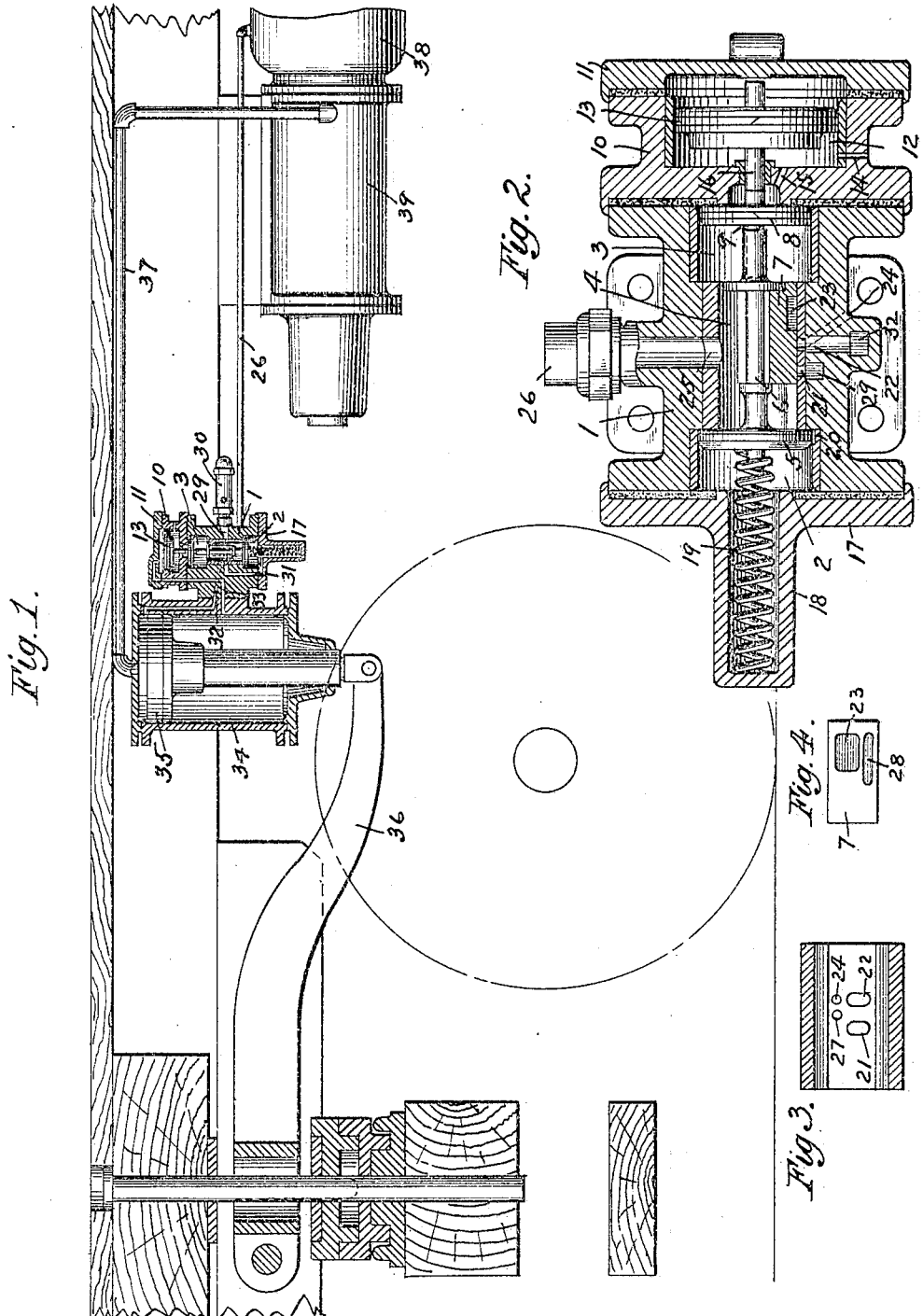

No. 788,112.

Patented April 25, 1905.

UNITED STATES PATENT OFFICE.

HARRY R. MASON, OF CHICAGO, ILLINOIS, ASSIGNOR TO THE WESTINGHOUSE AIR BRAKE COMPANY, OF PITTSBURG, PENNSYLVANIA, A CORPORATION OF PENNSYLVANIA.

FLUID-PRESSURE BRAKE.

SPECIFICATION forming part of Letters Patent No. 788,112, dated April 25, 1905.

Application filed June 26, 1903. Serial No. 163,222.

*To all whom it may concern:*

Be it known that I, HARRY R. MASON, a citizen of the United States, residing in Chicago, county of Cook, State of Illinois, have invented a certain new and useful Improvement in Fluid-Pressure Brakes, of which improvement the following is a specification.

This invention relates to fluid-pressure brakes, and has for its object to provide an improved valve device which may be operated according to the weight or load on the car for securing either light braking power or heavy braking power.

It is well known that in order to secure a maximum braking effect on cars, and particularly freight-cars, under all conditions of load it is necessary to provide means for giving a light braking power on cars when empty and for greatly increasing the braking power when the cars are loaded. For this purpose it has heretofore been proposed to adjust the system for a high brake-cylinder pressure sufficient to give the desired braking effect for a loaded car and to provide the brake-cylinder with a safety or blow-down valve having a cock or valve device adapted to be adjusted to "heavy-load" position for cutting out the safety-valve connection and adjusted to "light-load" position for cutting in the safety-valve, so as to blow down the cylinder-pressure to a degree for safely braking the empty car without danger of sliding the wheels. It has also been proposed to provide an additional or supplemental reservoir with a valve device adapted to be set in light-load position for cutting off communication between the auxiliary and the supplemental reservoirs for braking the car when empty and adapted to be set in heavy-load position for opening communication between said reservoirs, thereby increasing the reservoir capacity and the braking power for the car when loaded. Various other means—such as an additional brake-cylinder, an expansion-chamber, varying leverage, &c.—have been devised for securing increased braking power on heavily-loaded cars, and with nearly all of such apparatus a valve device or other means is used for cutting in or out certain ports or connections in order to adjust the system to secure either the light-load or the heavy-load braking power.

According to this invention the valve device is normally set in the heavy-load position, but is adapted to be adjusted to its light-load position on empty cars and to be automatically held in said light-load position during the period of light braking or until the system is relieved of fluid under pressure.

In the accompanying drawings, Figure 1 is a longitudinal sectional view of a portion of a car, showing one form of my invention applied thereto; Fig. 2, a central section of this form of valve device, taken at right angles to the view shown in Fig. 1; Fig. 3, a section of the valve-chamber, showing a plan of the ports in the valve-seat; Fig. 4, a face view of the slide-valve; Fig. 5, a plan of a car-brake equipment, showing a modified form of my invention; Fig. 6, a central vertical section of the valve device and lift-cylinder of Fig. 5; Fig. 7, a central section of a portion of the valve device, taken at right angles to the section shown in Fig. 6; Fig. 8, an end view of the valve-casing shown in Fig. 7; Fig. 9, a section of the slide-valve chamber, showing the arrangement of parts in the valve-seat; and Fig. 10, a face view of the slide-valve.

Referring now to the construction shown on Sheet 1 of the drawings, my improved valve device comprises a casing 1, containing piston-chambers 2 and 3 and slide-valve chamber 4, in which are located the pistons 5 and 8 and slide-valve 7, the latter being connected to the stem 6 of the piston 5 and one end of the stem 9 of piston 8 extending into and sliding within a recess in the end of the stem 6. The slide-valve 7 is provided with cavities 23 and 28 for controlling certain ports 21 and 22 and 27 and 24 in the slide-valve seat.

A spring 19, bearing upon the outer side of piston 5, extends into the hollow end 18 of the cap 17 and normally keeps the piston and slide-valve in the position shown with all ports closed. A casing 10 is secured against the opposite end of the valve-casing and contains a piston-chamber 12, in which is located piston 13, having a stem 16 extending through a bearing into engagement with the end of stem 9 of piston 8, the chambers on adjacent sides of pistons 8 and 13 being open to the atmosphere through ports 14 and 15, while the outer end of piston-chamber 12 is closed by cap 11. It will be noticed that the pistons 5 and 8 are of substantially the same size, while piston 13 has a much larger area.

As a means for operating my improved valve device according to the weight of the load on the car I provide a lift-cylinder 34, having a piston 35 connected to a lifting-lever 36, which may be connected up in any convenient or desirable manner for lifting a portion of the car-body—such as shown, for instance, in Patent No. 455,902, of July 14, 1891.

My improved valve device is preferably secured directly to the side of the lift-cylinder, as shown in Fig. 1, though it may be connected in any other way, if desired, and a port or passage 32 leads from the upper end of the lift-cylinder to port 22 in the slide-valve seat, while port or passage 33 leads from the middle portion of the lift-cylinder to the outer end of piston-chamber 12. A port or passage 31 leads from the port 27 in the valve-seat to the chamber 2 on the outer side of the piston 5, and a small equalizing-groove 20 is formed in the bushing around said piston at its inner or normal position, as shown in Fig. 2. The port 21 communicates with passage 29, leading to the safety or blow-down valve 30, which may be connected to the side of the casing, as shown in Fig. 1. The port 24 leads directly to the atmosphere, as indicated in dotted lines in Fig. 2. The pipe 26, communicating through opening 25 with the slide-valve chamber 4, leads from some source of fluid-pressure supply of the brake system, such as the train-pipe or auxiliary reservoir, and for the purpose of illustration it is shown connected to the auxiliary reservoir 38. A pipe 37 leads from the brake-cylinder 39 to the upper end of the lift-cylinder 34. Any desired source of fluid-pressure may also be used for operating the piston 35 of the lift-cylinder; but I prefer to employ the brake-cylinder pressure for this purpose, since the same will then be automatically supplied at each application of the brakes. The operation of this form of my apparatus will then be as follows: When the brake system is not charged with compressed air, the valve device occupies its normal position, as shown in Fig. 2, and as the same is charged up the air feeds through the equalizing-groove 20 around the piston 5, so that said piston is balanced as to air-pressure, which is substantially equal to that of the auxiliary reservoir, and the piston 8 is held seated tight against the gasket at the outer end of its chamber. This normal position of the valve device corresponds to what is called the "heavy-load" position, since all ports are closed by the slide-valve and the blow-down valve is cut off from communication with the brake-cylinder, so that the full or maximum braking power will be obtained. When a train of cars is made up and it is desired to set the valve devices on the respective cars to operate for either light or heavy braking, according as the cars are empty or loaded, air is admitted to the lift-cylinders. In the present instance this air is derived from the brake-cylinders and is supplied automatically upon the first or test application of the brakes, that is usually made before starting. The pressure in the lift-cylinder tends to force the piston down and lift a portion of the car, and the area of said piston and the leverage is so arranged that the pressure will be sufficient to actuate the lift-piston on empty cars, while it will not be sufficient to actuate the same on loaded cars. If then the car be empty, the piston 35 will move down past the port 33 and admit pressure to the large piston 13, which is sufficient to overcome the higher pressure acting on piston 8 and move all three pistons with the slide-valve to the left. As soon as the slide-valve has moved far enough to connect ports 24 and 27 by the cavity 28 the chamber 2 behind the piston 5 is exhausted to the atmosphere through passage 31 and ports 27 and 24. The auxiliary-reservoir pressure acting on piston 5 then assists in completing the movement of the valve and holds the piston firmly against its gasket, with the ports 21 and 22 communicating through the cavity 23 of the slide-valve. This corresponds with the light-load position of the valve, and the blow-down valve is in open communication with the brake-cylinder through passage 32 and pipe 37, so that the brake-cylinder pressure will be reduced at each application to the amount for which the blow-down valve is set. When the brakes are released after this first application, the lift-piston 35 returns to its normal position at the upper end of its cylinder and remains there throughout the period of light-load braking, since the piston 5 now holds the valve in the light-load position as long as pressure remains in the auxiliary reservoir. During subsequent applications of the brakes the excessive brake-cylinder pressure will quickly escape at the blow-down valve, and therefore will not accummulate a sufficient degree of pressure on the lift-piston 35 to move the same downward. The auxiliary-reservoir pressure in the valve-chamber now holds both pistons 5 and 8 pressed firmly against their respective gaskets, thus preventing leakage. The apparatus remains in this position during the operation of the train and until the air leaks off the car, which usually occurs when the car is cut out and shifted to a siding for loading or other purposes, at which time the spring 19 automatically returns the valve to heavy-load position. Then when the car is again coupled up in a train the valve will be in heavy-load position, and at the first application of the brakes the valve will be automatically set for light or heavy braking, according as to whether the car remains empty or has been loaded. If the car is loaded, the air-pressure admitted to act on lift-piston 35 will not be great enough to push the same down against the weight of the load acting on lever 36, so that no air will be admitted to the large piston 13 to move the valve, which will then remain in its heavy-load position with the ports closed and the blow-down valve cut out.

Referring now to the modification illustrated on Sheet 2 of the drawings, I have shown my invention applied to a load-brake apparatus employing an additional or supplemental reservoir and an additional feed-pipe connection, such as covered by my prior pending application, Serial No. 123,145, filed September 12, 1902. According to this construction the car equipment comprises train-pipe 40, branch pipe 41, triple valve 42, auxiliary reservoir 38, brake-cylinder 39, and supplemental reservoir 43. The load-regulated valve device is connected up in substantially the same manner as shown on Sheet 1, with the exception that the slide-valve is provided with ports for controlling communication between the two reservoirs and with the additional feed-pipe instead of controlling communication between the brake-cylinder and blow-down valve. For this purpose the slide-valve seat is provided with port 46, connected to pipe 45, leading to the supplemental reservoir, port 48, connected by passage 51 with additional feed-pipe 44, leading to the piston-chamber of the triple valve, and exhaust-port 47, leading to the atmosphere. The slide-valve 7 contains cavity 49 for connecting ports 46 and 47 when in light-load position and port or notch 50 for opening port 48 to the valve-chamber and reservoirs when in heavy-load position and also cavity 28 for connecting ports 27 and 24 in light-load position, as before described. When the valve is in its normal or heavy-load position, as shown in the drawings, the port 46 is uncovered and the port 50 registers with the port 48, so that the supplemental reservoir is in open communication with the auxiliary reservoir and the additional feed-passage is open to both reservoirs, thereby giving maximum braking power. The operation of this form of my device is similar to that before described and will now be readily understood. When the car is empty, the first application of the brakes operates to admit air to piston 13 to move the valve to light-load position, and as the cavity 28 connects ports 27 and 24 the chamber 2 is exhausted to the atmosphere and the air-pressure acting on the inner face of piston 5 holds the valve in light-load position, as before described. In this position the ports 46 and 48 are closed, thereby cutting off the supplemental reservoir and additional feed-passage, while ports 46 and 47 are connected by the cavity 49, so as to bleed the supplemental reservoir to the atmosphere. The brake apparatus then operates with the single auxiliary reservoir capacity, giving the light braking power designed for empty cars. When the air leaks off from the brake system of the car, the spring 19 automatically returns the valve to heavy-load position.

It will now be evident that I have provided an improved automatic valve device adapted to be used in connection with various forms of load-brake apparatus and to adjust the same for light or heavy braking, according to the load upon the car.

Having now described my invention, what I claim as new, and desire to secure by Letters Patent, is—

1. The combination with a fluid-pressure brake apparatus adapted to operate with light braking power or with heavy braking power, of a device for adjusting the apparatus to operate at either braking power, according to the load on the car, and means normally tending to shift said device to "heavy-load" position.

2. In a fluid-pressure brake apparatus, the combination with a device for adjusting said apparatus to operate either with light braking power or with heavy braking power, according to the load, of means controlled by the fluid-pressure of the brake system for normally shifting said device to its "heavy-load" position.

3. In a fluid-pressure brake apparatus, the combination with a valve device for adjusting said apparatus to operate either with light braking power or with heavy braking power, according to the load, of means normally tending to shift said valve device to its "heavy-load" position.

4. In a fluid-pressure brake apparatus, the combination with a valve device for adjusting said apparatus to operate either with light braking power or with heavy braking power, according to the load, of means controlled by the fluid-pressure of the brake system for normally shifting said valve device to its "heavy-load" position.

5. In a fluid-pressure brake apparatus, the combination with a valve device for adjusting said apparatus to operate either with light braking power or with heavy braking power, according to the load, of means actuated by the fluid-pressure of the brake system for holding said valve device in its "light-load" position when adjusted to that position.

6. In a fluid-pressure brake apparatus, the combination with a valve device for adjusting said apparatus to operate either with light braking power or with heavy braking power, according to the load, of means controlled by the fluid-pressure of the brake system for holding the valve device in its light-load position when set to that position and for returning said valve device to its normal heavy-load position when the pressure leaks off the brake system.

7. In a fluid-pressure brake, the combination with a valve device controlling ports for securing either light braking power or heavy braking power, of a pressure-operated lifting mechanism for controlling the adjustment of said valve device.

8. In a fluid-pressure brake apparatus, the combination with a device for adjusting said apparatus to operate either with light braking power or with heavy braking power, of a pressure-operated lifting mechanism for controlling the adjustment of said device.

9. In a fluid-pressure brake apparatus, the combination with a pressure-actuated valve device controlling ports for adjusting the apparatus to operate either with light braking power or with heavy braking power, of a pressure-operated lifting mechanism and means operated thereby for admitting fluid under pressure to actuate said valve device.

10. In a fluid-pressure brake apparatus, the combination with a device for adjusting said apparatus to operate either with light braking power or with heavy braking power, of a pressure-operated lifting mechanism, and means governed thereby for admitting fluid under pressure to actuate said device.

11. In a fluid-pressure brake apparatus, the combination with a valve device for adjusting said apparatus to operate either with light braking power or with heavy braking power, of a pressure-operated lifting mechanism for controlling the adjustment of said device, and means for holding said valve device in its light-load position when adjusted to that position.

12. In a fluid-pressure brake apparatus, the combination with a valve device for adjusting said apparatus to operate either with light braking power or with heavy braking power, of a lifting mechanism operated by brake-cylinder pressure for controlling the adjustment of said valve device, and pressure-operated means for holding said valve device in its light-load position when adjusted to that position.

13. A valve device for air-brakes, comprising a valve controlling ports for securing either light braking power or heavy braking power, a piston connected to said valve and normally balanced as to fluid-pressure, mechanism governed by the load on the car for adjusting said valve and means for releasing fluid-pressure from one side of said piston for holding the valve in the position to which it is adjusted.

14. A valve device for air-brakes, comprising a valve controlling ports for securing either light braking power or heavy braking power, a piston normally balanced as to fluid-pressure connected with said valve, mechanism for adjusting the position of said valve, and means for releasing pressure from one side of said piston for holding the valve in its adjusted position.

15. A valve device for air-brakes, comprising a valve controlling ports for securing either light braking power or heavy braking power, a piston normally balanced as to fluid-pressure connected with said valve, mechanism for adjusting the position of the valve according to the load on the car, and means controlled by the movement of said valve for releasing pressure from one side of said piston.

16. In a fluid-pressure brake apparatus, the combination of a valve controlling ports for adjusting said apparatus to operate either with light braking power or with heavy braking power, a piston normally balanced as to fluid-pressure connected with said valve, a spring acting to move said valve to its "heavy-load" position, mechanism for shifting the valve to its light-load position and means controlled by the movement of the valve to its light-load position for releasing pressure from one side of said piston.

17. In a fluid-pressure brake apparatus, the combination of a valve controlling ports for adjusting the braking power of the apparatus according to the load, a piston normally balanced as to fluid-pressure connected to said valve, ports also controlled by the valve for releasing pressure from one side of said piston, and pressure-operated means governed by the weight of the load for moving said valve from its normal position.

18. In a fluid-pressure brake apparatus, the combination of a valve controlling ports for adjusting the braking power of the apparatus according to the load, a piston normally balanced as to fluid-pressure connected with said valve, means controlled by the movement of the valve for releasing pressure from one side of said piston, another piston for moving said valve and means governed by the weight of the load for admitting fluid under pressure to said last-named piston.

19. In a fluid-pressure brake apparatus, the combination of a valve controlling ports for adjusting the braking power of the apparatus according to the load, a piston balanced as to fluid-pressure in its heavy-load position and connected to said valve, ports also controlled by the valve for releasing pressure from one side of the piston when the valve is moved to light-load position, fluid-pressure mechanism for shifting the valve to its "light-load" position, and a spring for returning the valve to its "heavy-load" position.

20. In a fluid-pressure brake apparatus, the combination of a valve-casing communicating with the auxiliary reservoir of the brake apparatus, a piston and valve in said casing, ports controlled by said valve for adjusting the braking power of the apparatus according to the load, a spring for holding said piston and valve in normal heavy-load position, means for balancing the pressure on opposite sides of the piston in its normal position and for releasing pressure from one side of the piston when moved to light-load position, and mechanism for moving said valve to its light-load position.

21. In a fluid-pressure brake apparatus, the combination of a valve controlling ports for adjusting the braking power of the apparatus according to the load, a piston for moving the valve to its light-load position and another piston for holding the valve in said position.

22. In a fluid-pressure brake apparatus the combination of a valve controlling ports for adjusting the braking power of the apparatus according to the load, a spring for normally holding said valve in its heavy-load position, a piston for moving the valve to its light-load position and another piston for holding the valve in said light-load position.

23. In a fluid-pressure brake apparatus, the combination with a valve-casing and valve controlling ports for adjusting the braking power of the apparatus according to the load, of a piston loosely connected with the valve for making a tight joint with the casing, and means engaging the outer side of the piston for moving said valve.

24. In a fluid-pressure brake apparatus, the combination with a valve-casing and valve controlling ports for adjusting the braking power of the apparatus according to the load, of a piston for moving said valve in one direction, and another smaller piston loosely connected with said valve and opposing the movement of the larger piston.

25. In a fluid-pressure brake apparatus, the combination with a valve-casing in open communication with fluid-pressure from the brake system and a valve therein controlling ports for adjusting the braking power of the apparatus according to the load, of a piston for moving said valve to its light-load position, a smaller piston loosely connected to said valve for maintaining a tight joint with the casing and opposing the movement of the larger piston, and another piston for holding said valve in light-load position.

26. The combination with a fluid-pressure brake apparatus having auxiliary and supplemental reservoirs, of a valve device for controlling communication between said reservoirs, and automatic means for normally shifting said valve device to open such communication.

27. The combination with a fluid-pressure brake apparatus having auxiliary and supplemental reservoirs, of a valve device for controlling communication between said reservoirs, and means controlled by the fluid-pressure of the brake system for normally shifting said valve device to open such communication.

28. The combination with a fluid-pressure brake apparatus having auxiliary and supplemental reservoirs, of a valve device for controlling communication between said reservoirs, and means actuated by the fluid-pressure of the brake system for holding the valve device in position to close such communication when adjusted to that position.

29. The combination with a fluid-pressure brake apparatus having auxiliary and supplemental reservoirs, of a valve for controlling communication between said reservoirs, and means controlled by the fluid-pressure of the brake system for holding the valve closed when set to that position, and means for automatically opening said valve when the pressure leaks off the brake system.

30. The combination with a fluid-pressure brake apparatus having auxiliary and supplemental reservoirs, a passage for connecting said reservoirs together, and an additional feed-passage for said reservoirs, of a valve device for controlling said passages, and means governed by the fluid-pressure of the brake system for normally shifting the valve device to open said passages.

31. The combination with a fluid-pressure brake apparatus having auxiliary and supplemental reservoirs, a passage for connecting the same together, and an additional feed-passage therefor, of a valve device for controlling said passages, and means actuated by the fluid-pressure of the brake system for holding the valve device in position to close said passages when adjusted to that position.

32. The combination with a fluid-pressure brake apparatus having auxiliary and supplemental reservoirs, of a valve-casing in open communication with the auxiliary reservoir, a port in said casing communicating with the supplemental reservoir, a valve controlling said port, a piston normally balanced as to fluid-pressure and connected to said valve, and a port controlled by the valve for releasing the pressure from one side of said piston.

In testimony whereof I have hereunto set my hand.

HARRY R. MASON.

Witnesses:
PAUL CARPENTER,
ALBERT C. HOWARD.